(12) United States Patent
Yi et al.

(10) Patent No.: US 9,381,844 B2
(45) Date of Patent: Jul. 5, 2016

(54) PUMP TRUCK STABILITY CONTROL SYSTEM, CONTROL METHOD, AND PUMP TRUCK

(75) Inventors: Xiaogang Yi, Changsha (CN); Mingling Wu, Changsha (CN); Zhikui Wei, Changsha (CN)

(73) Assignees: HUNAN SANY INTELLIGENT CONTROL EQUIPMENT CO., LTD, Changsha, Hunan (CN); SANY HEAVY INDUSTRIES CO., LTD, Changsha, Hunan (CN)

( * ) Notice: Subject to any disclaimer, the term of this patent is extended or adjusted under 35 U.S.C. 154(b) by 202 days.

(21) Appl. No.: 14/376,746

(22) PCT Filed: Apr. 14, 2012

(86) PCT No.: PCT/CN2012/074038
§ 371 (c)(1),
(2), (4) Date: Jan. 5, 2015

(87) PCT Pub. No.: WO2013/117046
PCT Pub. Date: Aug. 15, 2013

(65) Prior Publication Data
US 2015/0112555 A1 Apr. 23, 2015

(30) Foreign Application Priority Data
Feb. 6, 2012 (CN) .......................... 2012 1 0025292

(51) Int. Cl.
*G06F 7/70* (2006.01)
*G06F 19/00* (2011.01)
(Continued)

(52) U.S. Cl.
CPC . *B60P 1/00* (2013.01); *E04G 21/04* (2013.01); *E04G 21/0436* (2013.01); *E04G 21/0463* (2013.01); *G05D 15/00* (2013.01)

(58) Field of Classification Search
CPC ......... E02F 9/2025; E02F 9/26; E02F 9/2045; A01B 79/005; A01B 69/008
USPC .......................................................... 701/50
See application file for complete search history.

(56) References Cited

FOREIGN PATENT DOCUMENTS

| CN | 101967883 | 2/2011 |
|---|---|---|
| CN | 102147959 | 8/2011 |

(Continued)

OTHER PUBLICATIONS

Search Report and Written Opinion dated Nov. 22, 2012 for corresponding International Application No. PCT/CN2012/074038 (8 pgs.).

*Primary Examiner* — Maceeh Anwari
(74) *Attorney, Agent, or Firm* — Timothy S. Westby; Porter Hedges LLP

(57) ABSTRACT

The invention discloses a pump truck stability control system, which comprises a detecting device and a controlling device, wherein the detecting device is used for detecting current pumping state parameters, boom posture parameters, landing leg posture parameters, pump truck body position state parameters and current numerical signals of external load parameters acting on a boom system of a pump truck, and the controlling device is used for receiving the current numerical signals of the above parameters, calculating the complete machine gravity center position of the concrete pump truck according to the parameters, and performing stability control for the pump truck according to the position of the complete machine gravity center in a pump truck stability area. The stability control system comprehensively takes pump truck own factors and external load influence factors into consideration, gravity center computational precision is high, and construction safety of the concrete pump truck is enhanced. In addition, the invention further provides a pump truck stability control method and a pump truck comprising the pump truck stability control system.

17 Claims, 9 Drawing Sheets

| (51) | Int. Cl. | | (56) | References Cited | |
|---|---|---|---|---|---|
| | G06G 7/00 | (2006.01) | | | |
| | G06G 7/76 | (2006.01) | | FOREIGN PATENT DOCUMENTS | |
| | B60P 1/00 | (2006.01) | | | |
| | E04G 21/04 | (2006.01) | CN | 102330498 | 1/2012 |
| | G05D 15/00 | (2006.01) | JP | 200190342 | 4/2001 |
| | | | JP | 200568777 | 3/2005 |

PUMP TRUCK STABILITY CONTROL SYSTEM, CONTROL METHOD, AND PUMP TRUCK

This application is the national phase entry of PCT Application No. PCT/CN2012/074038 filed on Apr. 14, 2012, which claims the priority of Chinese Patent Application No. 201210025292.5, filed on Feb. 6, 2012 with the State Intellectual Property Office of the PRC. The disclosures of the aforementioned applications are incorporated herein by reference in their entirety.

FIELD OF THE INVENTION

The present invention involves the technical field of concrete pump truck control, and particularly, relates to a pump truck stability control system. In addition, the present invention further provides a pump truck stability control method and a pump truck.

BACKGROUND OF THE INVENTION

A concrete pump truck is a typical pump truck, and to ensure safety during the construction of the concrete pump truck, a usual practice is to use a removable protruding landing leg so as to extend the length of a landing leg and then expand the support range of the concrete pump truck to reduce danger of rollover. However, during the operation of the concrete pump truck, external loads such as actions of a boom and pumping operation incur the vibration of the whole truck, and then result in offset of gravity centre, and also, the geographic factors of the operation environments of the concrete pump truck are complex, when an operator misestimates the state of the pump truck or misoperates the pump truck, rollover may be incurred.

Therefore, complete machine stability is an important index for evaluating the performances of the concrete pump truck, and decides the working performance of the concrete pump truck, and relates to the reasonableness and safety of the design of the concrete pump truck as well as the personal safety of the operator at the construction site, thus, ensuring the stability during the operation of the concrete pump truck is especially important.

A typical stability control system in the prior art usually comprises a detecting device, a controlling device and an alarm device, and the detecting device is mainly used for detecting the current positions of the gravity centers of the parts of the concrete pump truck and transmitting gravity centre position signals to the controlling device, and the controlling device calculates a complete machine gravity centre according to a predetermined strategy and compares it with a preset balance range, when the complete machine gravity centre falls out of the balance range, the alarm device alarms.

As known to all, during operation the concrete pump truck is affected by various environments and use conditions, while the detecting device in the prior art only takes into consideration several factors of turret dip angle, boom extension, the unfolding angle of the landing leg and the displacement of the landing leg to calculate the gravity centre of a concrete pump truck system and conduct anti-rollover analysis of the pump truck, as the factors as considered are few, the precision in calculating the gravity centre of the system is poor.

Also, the balance range in the prior art for judging the gravity centre position of the pump truck is set in advance and fixed, the error of judging is large.

Therefore, how to provide a stability control system with high precision in calculating the gravity centre of the pump truck and improve the safety of the pump truck during operation have been problems to be urgently solved by one skilled in the art.

SUMMARY OF THE INVENTION

An object of the present invention is to provide a pump truck stability control system which has high precision in calculating gravity centre and improves safety during the operation of the pump truck. The other object of the present invention is provide a pump truck comprising the stability control system, and a pump truck stability control method.

To solve the first problem, the present invention provides a pump truck stability control system comprising a detecting device and a controlling device, the detecting device is used for obtaining pumping state parameters, boom posture parameters, landing leg posture parameters, pump truck body position state parameters and current numerical signals of external load parameters acting on a boom;

the controlling device comprises a complete machine gravity centre calculating unit and a pump truck stability control unit;

the complete machine gravity centre calculating unit is used for receiving the current numerical signals of the parameters detected by the detecting device, and first calculating the gravity center position of a boom system according to the pumping state parameters, the boom posture parameters and the external load parameters, calculating the gravity centre position of the body of the pump truck according to the landing leg posture parameters and the pump truck body position state parameters, and then calculating the complete machine gravity centre position of the concrete pump truck according to the gravity centre position of the boom system and the gravity centre position of the body of the pump truck; and the pump truck stability control unit conducts stability control over the pump truck according to the position of the complete machine gravity centre in a pump truck stable area.

Preferably, the pump truck stable area comprises a first stable area, the positions of the support points of the landing legs are determined according to the landing leg posture parameters, and a first polygon boundary formed by sequentially connecting the support points of the landing legs is the boundary of the first stable area; a second stable area is provided within the boundary of the first stable area, and a second polygon boundary determined according to the first stable area and preset safe operation parameters is the boundary of the second stable area.

Preferably, the controlling device further comprises an area adjusting unit which adjusts the boundary of the second stable area in combination with the pumping state parameters.

Preferably, the controlling device further comprises a stability alarm unit;

When the complete machine gravity center position is out of the second stable area, the pumping truck stability control unit sends a first stability alarm signal, and the stability alarm unit conducts a first stability alarm prompt; or, when the complete machine gravity center position is within the second stable area and the minimum distance between the complete machine gravity center and the boundary of the second stable area is smaller than or equal to a predetermined safe distance, the pump truck stability control unit sends a second stability alarm signal, and the stability alarm unit conducts a second stability alarm prompt.

Preferably, the controlling device further comprises a state locking unit;

When the complete machine gravity center is out of the second stable area, the state locking unit sends a state lock control signal, and the pumping state controlling device and/or boom posture controlling device of the pump truck locks the current pumping state parameters and/or the boom posture parameters of the pump truck according to the state lock signal.

Preferably, the controlling device further comprises a self-adaptation adjusting unit;

When the complete machine gravity center is out of the second stable area, the self-adaptation adjusting unit sends a self-adaptation adjustment signal, and the pumping state controlling device and/or boom posture controlling device of the pump truck adjusts the current pumping state parameters and/or the boom posture parameters of the pump truck according to the self-adaptation adjustment signal so that the complete machine gravity center is within the second stable area.

Preferably, the detecting device comprises a detecting unit for detecting the external load on the boom system, which is provided on the boom of the pump truck.

Preferably, the gravity center position of the boom system is calculated according to the following formulas:

$$\begin{cases} \sum_{i=1}^{n} OF_{iz} \times F_{iz} + OG_{1z} \times G_{1z} + OG_{2z} \times G_{2z} + Mf_{1z} + K3 = 0 \\ \sum_{i=1}^{n} OF_{iy} \times F_{iy} + OG_{1y} \times G_{1y} + OG_{2y} \times G_{2y} + Mf_{1y} + K2 = 0 \\ \sum_{i=1}^{n} OF_{ix} \times F_{ix} + OG_{1x} \times G_{1x} + OG_{2x} \times G_{2x} + Mf_{1x} + K1 = 0 \end{cases}$$

$$\begin{cases} \sum_{i=1}^{n} F_{iz} + G_{1z} + G_{2z} + f_{1z} = 0 \\ \sum_{i=1}^{n} F_{iy} + G_{1y} + G_{2y} + f_{1y} = 0 \\ \sum_{i=1}^{n} F_{ix} + G_{1x} + G_{2x} + f_{1x} = 0 \end{cases}$$

Wherein, in the above formulas, $F_{ix}$, $F_{iy}$, and $F_{iz}$ respectively represent the component forces of the gravity force of the $i^{th}$ zoom at axis x, axis y and axis z, $OF_{ix}$, $OF_{iy}$ and $OF_{iz}$ respectively represent the arms of force of the component forces of the gravity force of the $i^{th}$ zoom at axis x, axis y and axis z, $G_{1x}$, $G_{1y}$ and $G_{1z}$ respectively represent the component forces of the force determined by the external load parameters at axis x, axis y and axis z, $OG_{1x}$, $OG_{1y}$ and $OG_{1z}$ respectively represent the arms of force of the component forces of the force determined by the external load parameters at axis x, axis y and axis z, $G_{2x}$, $G_{2y}$ and $G_{2z}$ respectively represent the component forces of the gravity forces of a zoom connecting part and a conveying pipe at axis x, axis y and axis z, $Mf_{1x}$, $Mf_{1y}$ and $Mf_{1z}$ respectively represent the torques of pumping impact at axis x, axis y and axis z, $OG_{2x}$, $OG_{2y}$ and $OG_{2z}$ respectively represent the arms of force of the component forces of the gravity forces of the zoom connecting part and the conveying pipe at axis x, axis y and axis z; and K1, K2 and K3 respectively represent torque compensation values acting on axis x, axis y and axis z.

The stability control system in the present invention takes into consideration not only the factor parameters of the concrete pump truck such as the pumping state parameters, the zoom posture parameters, the landing leg posture parameters and the pump truck body position state parameters, but also external load factors and external load parameters, that is, the influence of external factors on the stability of the concrete pump truck, and the considered factors are comprehensive, and the present invention also provides a precise method for calculating the complete machine gravity center position, improves the precision of the stability control system in calculating the gravity center, enhances the accuracy of control, and improves the safety of the concrete pump truck during construction.

In addition, the present invention also provides a pump truck comprising any of the above pump truck stability control systems, as the concrete pump truck comprises the stability control system comprising the above technical effect, the concrete pump truck comprises the technical effect of the above stability control systems.

Besides the above two, the present invention also provides a pump truck stability control method, which is carried out according to following steps:

Step S101, detecting current pumping state parameters, boom posture parameters, landing leg posture parameters, pump truck body position state parameters and current numerical signals of external load parameters acting on a boom system of the pump truck;

Step S102, receiving the current numerical signals of the above parameters, and first calculating the gravity center position of the boom system according to the pumping state parameters, the boom posture parameters and the external load parameters, calculating the gravity centre position of the body of the pump truck according to the landing leg posture parameters and the pump truck body position state parameters, and then calculating the complete machine gravity centre position of the concrete pump truck according to the gravity centre position of the boom system and the gravity centre position of the body of the pump truck; and step S103, conducting stability control over the pump truck according to the position relationship of the complete machine gravity centre in a pump truck stable area.

Preferably, step S103 is specifically as follow:

when the complete machine gravity center position is out of the second stable area, a first stability alarm signal is sent to conduct a first stability alarm prompt; or, when the complete machine gravity center position is within the second stable area and the minimum distance between the complete machine gravity center and the boundary of the second stable area is smaller than or equal to a predetermined safe distance, a second stability alarm signal is sent to conduct a second stability alarm prompt.

Preferably, step S103 is specifically as follow:

When the complete machine gravity center is out of the second stable area, a state lock control signal is sent, and the pumping state controlling device and/or boom posture controlling device of the pump truck locks the current pumping state parameters and/or the boom posture parameters of the pump truck according to the state lock signal.

Preferably, step S103 is specifically as follow:

When the complete machine gravity center is out of the second stable area, a self-adaptation adjustment signal is sent, and the pumping state controlling device and/or boom posture controlling device of the pump truck adjusts the current pumping state parameters and/or the boom posture parameters of the pump truck according to the self-adaptation adjustment signal so that the complete machine gravity center of the pump truck is within the second stable area.

A pump truck stability control method provided by the present invention is executed by the above pump truck stability control system, and thus also comprises the technical effect of the above pump truck stability control system.

DETAILED DESCRIPTION OF THE PRESENT INVENTION

The core of the present invention is to provide a pump truck stability control system, which achieves high precision in the calculation of gravity center and improves the safety during the operation of the pump truck. The other core of the present invention is to provide a pump truck comprising the stability control system, and a pump truck stability control method.

To make one skilled in the art better understand the technical solutions of the present invention, the present invention will be further detailed hereinafter in combination with the stability control system and the stability control method of the concrete pump truck and the drawings and specific embodiments.

Without loss of generality, the technical solutions of the present invention will be described with a concrete pump truck having five booms as an example.

Figure 1:
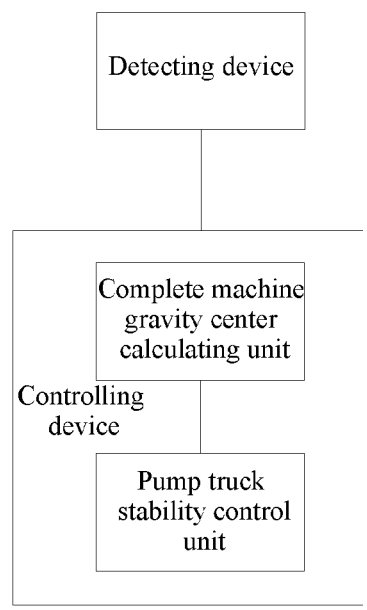
FIG. 1 is a block diagram of the constitution of the first embodiment of the pump truck stability control system provided by the present invention.

Referring to FIG. 1, it is a block diagram of the constitution of the first embodiment of the concrete pump truck stability control system provided by the present invention.

The present invention provides a pump truck stability control system comprising a detecting device and controlling device.

the detecting device is used for detecting current pumping state parameters, boom posture parameters, landing leg posture parameters, pump truck body position state parameters and external load parameters acting on a pump truck boom system, wherein, the pumping state parameters mainly refer to working state parameters of a pumping operation, such as the pressure of the hydraulic system of a pumping mechanism, the opening of an oil pump, the motion stroke of a piston, the motion speed of the piston, reversing pressure, the number of reversings and internal pressure of a master cylinder, the boom posture parameters mainly refer to the parameters of the working positions of the booms of the boom system, such as unfolding angles and unfolding directions of the booms, the landing leg posture parameters mainly comprise the angles between the landing legs during operation, the extension lengths of the landing legs and etc., the pump truck body position state parameters comprises the position parameters of the pump truck body and a predetermined plane, for example, the parameter of the angle between the pump truck body and the horizontal plane; the above parameters may refer to relevant technical materials in the prior art, which are omitted herein.

The above parameters can be detected with corresponding detecting members, for example, the pump truck body position state parameters can be obtained through a dip angle sensor 1 mounted on the chassis body of the pump truck, the boom posture parameters can be obtained through boom angle sensors 3 provided on respective booms for detecting the unfolding angles of the booms, the landing leg posture parameters can be obtained through landing leg angle sensors 4 and landing leg displacement sensors 5 provided on the landing legs, and the landing leg displacement sensors 4 detect the flex displacement of a flexing landing leg, and the landing leg angle sensors 5 are used for detecting the swing angle of a swinging landing leg. Please refer to FIG. 9 and FIG. 10.

The external load parameters mainly comprise the force applied by external environments on the concrete pump truck (for example, the influence of wind, rain and etc. on the concrete pump truck), as the influence of the external environments on the pump truck body is small, the present invention takes into consideration influence factors of external environments on the boom system. Specifically, an external load parameter detecting part can be mounted on each boom of the boom system, or is mounted at a suitable position of a proper boom, for example, in FIG. 6 the external load parameter detecting part can be provided on the third boom. For example, if the external load is wind force applied on the boom system, a wind speed sensor can be mounted on the boom system, and wind speed grades can be obtained through the wind speed sensor and is then converted into wind force, i.e., the size of external load applied by the wind on the boom.

The controlling device comprises a complete machine gravity centre calculating unit and a pump truck stability control unit; the complete machine gravity centre calculating unit is used for receiving the parameters detected by the detecting device, and first calculating the gravity center position of a boom system according to the pumping state parameters, the boom posture parameters and the external load parameters, calculating the gravity centre position of the body of the pump truck according to the landing leg posture parameters and the pump truck body position state parameters, and then calculating the complete machine gravity centre position of the concrete pump truck according to the gravity centre position of the boom system and the gravity centre position of the body of the pump truck. Specifically, the calculating methods in this unit can comprise a finite element method, a force system balancing method, a torque balancing method and etc., and such methods have strong adaptation and help achieve computer programming.

Following is a brief description of the method for calculating the gravity center position of the boom system in the present invention, and the static gravity center position of the overall boom system is calculated according to the static gravity center position of a single boom in combination with the posture of the boom, then pumping state parameters (when the gravity center position of the boom system is calculated, at this moment the pumping state parameters can be pumping reversing impact parameters) and the influence of the external loads are integrated, and pumping reversing impact and external loads are integrated in the form of acting forces into the torque of the static gravity center of the boom system; in an established optimal coordinate system, the system is subjected to a force analysis through a force system balancing method and a torque balancing method, then actual gravity centre coordinates of the overall boom system are calculated through a torque balancing equation and a force system balancing equation. The specific formulas are shown as follow:

$$\begin{cases} \sum_{i=1}^{n} OF_{iz} \times F_{iz} + OG_{1z} \times G_{1z} + OG_{2z} \times G_{2z} + Mf_{1z} + K3 = 0 \\ \sum_{i=1}^{n} OF_{iy} \times F_{iy} + OG_{1y} \times G_{1y} + OG_{2y} \times G_{2y} + Mf_{1y} + K2 = 0 \\ \sum_{i=1}^{n} OF_{ix} \times F_{ix} + OG_{1x} \times G_{1x} + OG_{2x} \times G_{2x} + Mf_{1x} + K1 = 0 \end{cases}$$

$$\begin{cases} \sum_{i=1}^{n} F_{iz} + G_{1z} + G_{2z} + f_{1z} = 0 \\ \sum_{i=1}^{n} F_{iy} + G_{1y} + G_{2y} + f_{1y} = 0 \\ \sum_{i=1}^{n} F_{ix} + G_{1x} + G_{2x} + f_{1x} = 0 \end{cases}$$

Wherein, in the above formulas, in the above formulas, $F_{ix}$, $F_{iy}$, and $F_{iz}$ respectively represent the component forces of the gravity force of the $i^{th}$ zoom at axis x, axis y and axis z, $OF_{ix}$, $OF_{iy}$ and $OF_{iz}$ respectively represent the arms of force of the component forces of the gravity force of the $i^{th}$ zoom at axis x, axis y and axis z, $G_{1x}$, $G_{1y}$ and $G_{1z}$ respectively represent the component forces of the force determined by the external load parameters at axis x, axis y and axis z, $OG_{1x}$, $OG_{1y}$ and $OG_{1z}$ respectively represent the arms of force of the component forces of the force determined by the external load parameters at axis x, axis y and axis z, $G_{2x}$, $G_{2y}$ and $G_{2z}$ respectively represent the component forces of the gravity forces of a zoom connecting part and a conveying pipe at axis x, axis y and axis z, $Mf_{1x}$, $Mf_{1y}$ and $Mf_{1z}$ respectively represent the torques of pumping impact at axis x, axis y and axis z, $OG_{2x}$, $OG_{2y}$ and $OG_{2z}$ respectively represent the arms of force of the component forces of the gravity forces of the zoom connecting part and the conveying pipe at axis x, axis y and axis z; and K1, K2 and K3 respectively represent torque compensation values acting on axis x, axis y and axis z, and the torque compensation values are preset in consideration of the model of the pump truck, the length of the boom, current pumping displacement and current pumping state.

In addition, the pump truck stability control unit in the controlling device is used for judging the position relationship between the complete machine gravity center and the pump truck stable area in the current state, and obtaining the judging result of the complete machine gravity center and the pump truck stable area in the current state, that is, whether the complete machine gravity center falls within or out of the pump truck stable area; the pump truck is subjected to stability control according to the judging result of the position relationship between the complete machine gravity center and the pump truck stable area in the current state, that is, sending a stability control signal.

The stability control signal can be an alarm signal, an adjustment signal of a boom action and/or a pumping state, and a lock signal of the boom action and/or the pumping state; the alarm signal can remind an operator that the current state of the concrete pump truck is a dangerous working condition, so as to take corresponding measures to improve the current working condition of the concrete pump truck so that it is in a safe working condition, or a control signal is directly sent to an executing part of the concrete pump truck to automatically adjust the operation condition of the concrete pump truck, so that the complete machine gravity center is within the stable area to ensure the safe operation of the concrete pump truck, or a control signal is directly sent to the executing part of the concrete pump truck, and then the current operation condition of the concrete pump truck is locked automatically to avoid the rollover of the concrete pump truck.

Of course, the stability control signal can also be the combination of the alarm signal and the adjustment signal, to adjust the working state of the concrete pump truck while remind a user of the current working state of the concrete pump truck, so that the complete machine gravity center moves towards the stable area; or, the stability control signal is the combination of the alarm signal and the lock signal, to lock the working state of the concrete pump truck while remind the user of the current working state of the concrete pump truck and then avoid the rollover of the concrete pump truck.

It needs to be indicated that the execution of the above stability control signals can be received and conducted by corresponding executing parts.

The stability control system in the present invention takes into consideration not only the factor parameters of the concrete pump truck such as the pumping state parameters, the zoom posture parameters, the landing leg posture parameters and the pump truck body position state parameters, but also external load parameters, that is, the influence of external environment factors on the stability of the concrete pump truck, and the considered factors are comprehensive, and the present invention also provides a precise method for calculating the complete machine gravity center position, improves the precision of the stability control system in calculating the gravity center, enhances the accuracy of control, and improves the safety of the concrete pump truck during construction.

Figure 2:
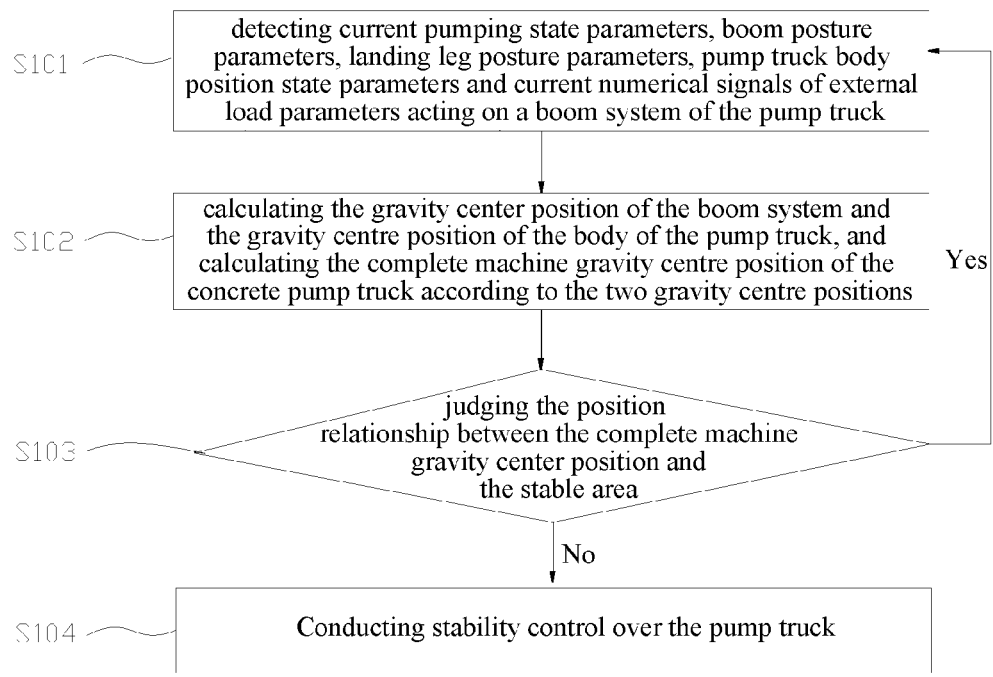
FIG. 2 is a flow chart of the first embodiment of the pump truck stability control method provided by the present invention.

Referring to FIG. 2, FIG. 2 is a flow chart of the first embodiment of the pump truck stability control method provided by the present invention, and the control method comprises the following steps:

Step S101, detecting current pumping state parameters, boom posture parameters, landing leg posture parameters, pump truck body position state parameters of the pump truck and external load parameters acting on a boom system of the pump truck;

Step S102, first calculating the gravity center position of the boom system according to the pumping state parameters, the boom posture parameters and the external load parameters, calculating the gravity centre position of the body of the pump truck according to the landing leg posture parameters and the pump truck body position state parameters, and then calculating the complete machine gravity centre position of the concrete pump truck according to the gravity centre position of the boom system and the gravity centre position of the body of the pump truck; and Step S103, conducting stability control over the pump truck according to the position relationship of the complete machine gravity centre in a pump truck stable area.

In specific embodiments, the stable area can comprise a first stable area and a second stable area within the boundary of the first stable area, and the boundary of the first stable area can be determined by the support points of the landing legs determined according to the landing leg posture parameters, and a first polygon boundary formed by sequentially connecting the support points of the landing legs is the boundary of the first stable area; a second polygon boundary determined according to the first stable area and preset safe operation parameters is the boundary of the second stable area. Specifically, a pump truck database can be established comprising pump truck model, boom length, pumping displacement, pumping master system working parameters and etc., and then preset safe operation parameters are determined according to the parameters; during specific implementation, the area ratio of the two polygons and/or the distance parameters of the sides of the two polygons can be determined according to the above parameters, for example, it is determined according to the above parameters that the area of the second polygon is 0.9 time of the area of the first polygon, and/or the distance parameters of the sides of the second polygon and the corresponding sides of the first polygon are determined.

In the present invention, the stable area is divided into a first stable area and a second stable area, and more accurate control over the pump truck can be achieved and pump truck operation safety can be enhanced. The arrangement manner depends on the position relationship between the complete machine gravity center and the first stable area boundary and the second stable area boundary, different control solutions can be selected to achieve multi-layered control to further enhance control over the pump truck safety.

In a preferable embodiment, the controlling device in the present invention can further comprise an area adjusting unit, and the area adjusting unit evaluates the stability safety of the pump truck according to the current operation parameters transmitted in real time by the detecting device and thus adjusts the boundary of the second stable area to meet needs of current pump truck operation parameters. The stability control system in the present invention can conduct real-time adjustment and planning to the second stable area to adapt to different working conditions of the concrete pump truck and further improve the accuracy of the control system in determining the stability of the concrete pump truck.

Moreover, in a preferable solution, the control system can be further provided with a stability analyzing module which can comprise CSP (conservative support polygon) rule, ESM (energy stability margin) rule, CSSM (compliance stance stability margin) rule, ZMP (zero moment point) rule and force-angle stability measuring method and etc., to adapt to the anti-rollover measurement rule of a flexible multi-freedom concrete pump truck.

Figure 3:
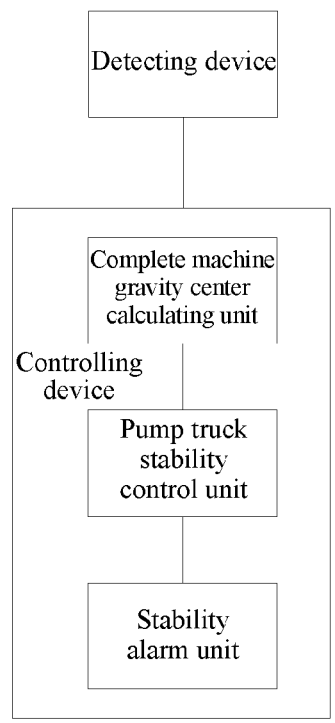
FIG. 3 is a block diagram of the constitution of the second embodiment of the pump truck stability control system provided by the present invention.

Referring to FIG. 3, FIG. 3 is a block diagram of the constitution of the second embodiment of the concrete pump truck stability control system provided by the present invention.

In this preferable embodiment, the controlling device further comprises a stability alarm unit which is connected with the pump truck stability control unit.

When the complete machine gravity center position is out of the second stable area, the stability control signal sent by the pumping truck stability control unit is a first stability alarm signal, and the stability alarm unit conducts a first stability alarm prompt; or, when the complete machine gravity center position is within the second stable area and the minimum distance between the complete machine gravity center and the boundary of the second stable area is smaller than or equal to a predetermined safe distance, the pump truck stability control unit sends a second stability alarm signal, and the stability alarm unit conducts a second stability alarm prompt. This arrangement can improve operator's understanding of the operation condition of the concrete pump truck, and the control flexibility is high.

Figure 4:
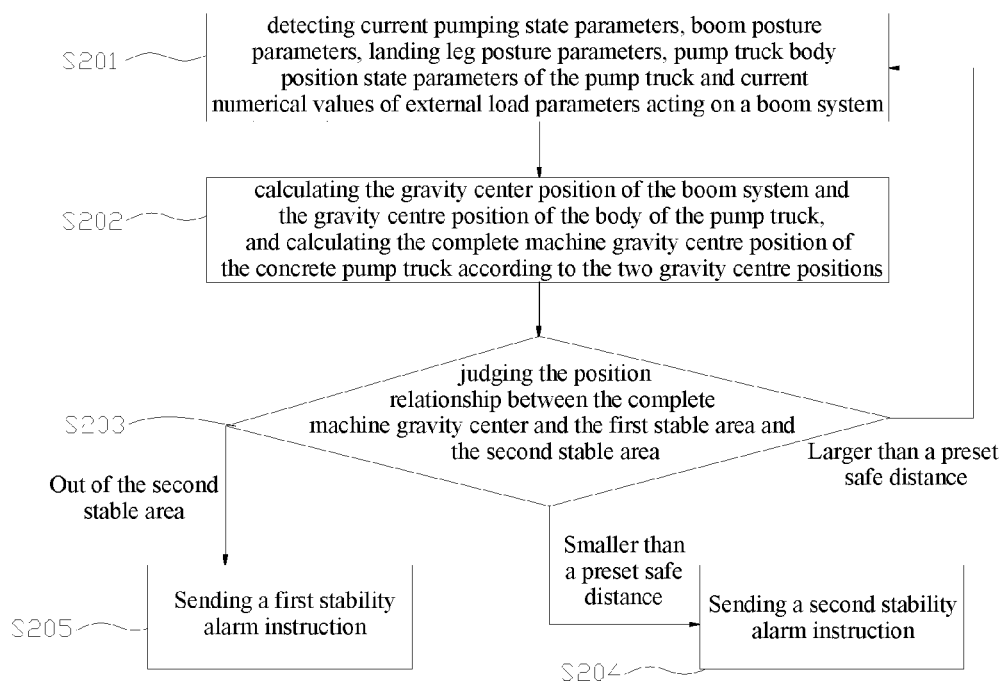
FIG. 4 is a flow chart of the second embodiment of the pump truck stability control method provided by the present invention.

Referring to FIG. 4, FIG. 4 is a flow chart of the second embodiment of the pump truck stability control method provided by the present invention, and the control method comprises the following steps:

Step S201, detecting current pumping state parameters, boom posture parameters, landing leg posture parameters, pump truck body position state parameters of the pump truck and external load parameters acting on a boom system;

Step S202, first calculating the gravity center position of the boom system according to the pumping state parameters, the boom posture parameters and the external load parameters, calculating the gravity centre position of the body of the pump truck according to the landing leg posture parameters and the pump truck body position state parameters, and then calculating the complete machine gravity centre position of the concrete pump truck according to the gravity centre position of the boom system and the gravity centre position of the body of the pump truck;

Step S203, judging the position relationship between the complete machine gravity center and the second stable area, if the complete machine gravity center position is out of the second stable area, sending a first stability alarm signal, and executing step S204; if the complete machine gravity center position is within the second stable area and the minimum distance between the complete machine gravity center and the second stable area boundary is smaller than/equal to a predetermined safe distance, sending a second stability alarm signal, and executing step S205, otherwise returning to step S201;

Step S204, the stability alarm unit conducts a first stability alarm prompt; and Step S205, the stability alarm unit conducts a second stability alarm prompt.

Of course, the stable area can be divided into more grades of areas, and correspondingly more grades of alarm devices are provided, and the alarm devices can remind the operator in different forms of sound, light or the combination of the two, so that the operator can more conveniently get to know the operation condition of the concrete pump truck and then conduct maintenance timely.

Figure 5:
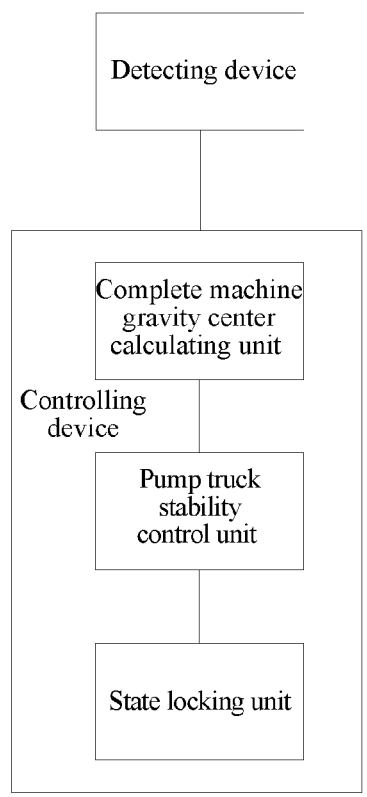
FIG. 5 is a block diagram of the constitution of the third embodiment of the pump truck stability control system provided by the present invention.

Referring to FIG. 5, FIG. 5 is a block diagram of the constitution of the third embodiment of the pump truck stability control system provided by the present invention.

In this preferable embodiment, to enhance the safety of the pump truck, the controlling device further comprises a state locking unit connected with the pump truck stability control unit.

When the complete machine gravity center is out of the second stable area, the state locking unit sends a state lock control signal, and the pumping state controlling device and/or boom posture controlling device of the pump truck locks the current pumping state parameters and/or the boom posture parameters of the pump truck according to the state lock signal.

Figure 6:
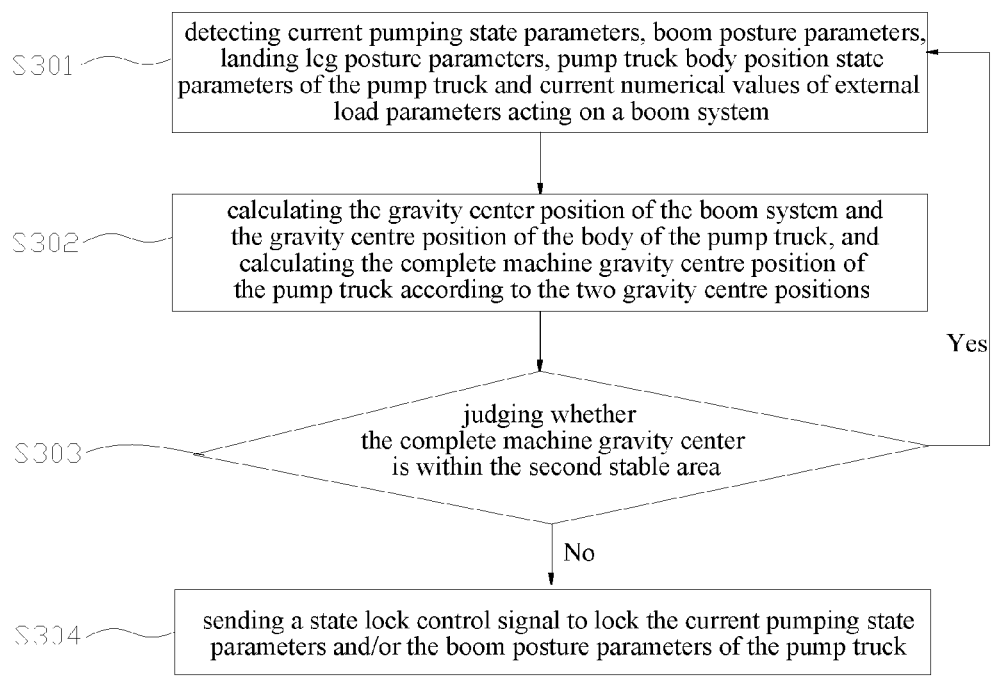
FIG. 6 is a flow chart of the third embodiment of the pump truck stability control method provided by the present invention.

Referring to FIG. 6, FIG. 6 is a flow chart of the third embodiment of the pump truck stability control method provided by the present invention, and the control method comprises following steps:

Step S301, detecting current pumping state parameters, boom posture parameters, landing leg posture parameters, pump truck body position state parameters of the pump truck and external load parameters acting on a boom system;

Step S302, first calculating the gravity center position of the boom system according to the pumping state parameters, the boom posture parameters and the external load parameters, calculating the gravity centre position of the body of the pump truck according to the landing leg posture parameters and the pump truck body position state parameters, and then calculating the complete machine gravity centre position of the concrete pump truck according to the gravity centre position of the boom system and the gravity centre position of the body of the pump truck;

Step S303, judging whether the complete machine gravity center is within the second stable area, if it is, executing step S301, and otherwise executing step S304; and Step S304, sending a state lock control signal, and the pumping state controlling device of the pump truck locks the current pumping state parameters of the pump truck according to the state lock signal, and/or the boom posture controlling device of the pump truck locks the boom posture parameters according to the state lock signal.

In this preferable embodiment, when the complete machine gravity center is out of the second stable area, the risk of rollover of the pump truck is high, to enhance the safety of the operation of the pump truck, the pumping state parameters and/or boom posture parameters can be locked in a locking way to avoid further motion of the complete machine gravity center of the pump truck towards the boundary of the first stable area, thereby lowering the risk of the rollover of the pump truck.

Figure 7:
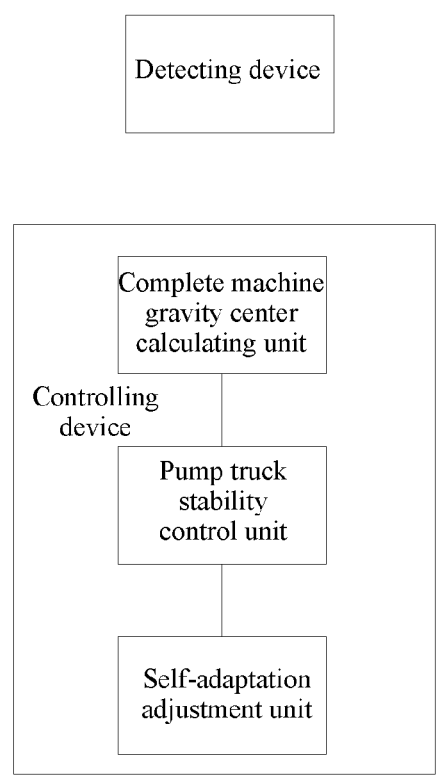
FIG. 7 is a block diagram of the constitution of the fourth embodiment of the pump truck stability control system provided by the present invention.

Referring to FIG. 7, FIG. 7 is a block diagram of the constitution of the fourth embodiment of the concrete pump truck stability control system provided by the present invention.

In this preferable embodiment, the controlling device can further comprise a self-adaptation adjusting unit connected with the pump truck stability control unit.

When the controlling device determines that the complete machine gravity center is out of the second stable area, the self-adaptation adjusting unit sends a self-adaptation adjustment signal, and the pumping state controlling device and/or boom posture controlling device of the pump truck adjusts the current pumping state parameters and/or the boom posture parameters of the pump truck according to the self-adaptation adjustment signal so that the complete machine gravity center is within the second stable area.

For example, the controlling device in the present invention can use advanced control theories such as self-adaptation control and robust control, and automatically adjusts parameters such as the current of a multi-way valve and pumping state according to changes of the gravity center, that is, gravity center track, boom posture and pumping impact are used as input of a controller, and the gravity center position is adjusted in real time for gravity center offset within a certain range in combination with external loads, pumping truck displacement and boom action which are deemed as interference factors to the system, and then it is ensured that the gravity center position is within the second stable area.

Compared with the prior art, the stability control system in the present invention can adjust the pumping state parameters and/or the boom posture parameters of the concrete pump truck so that the gravity center of the concrete pump truck falls within the second stable area to enhance stability.

Figure 8:
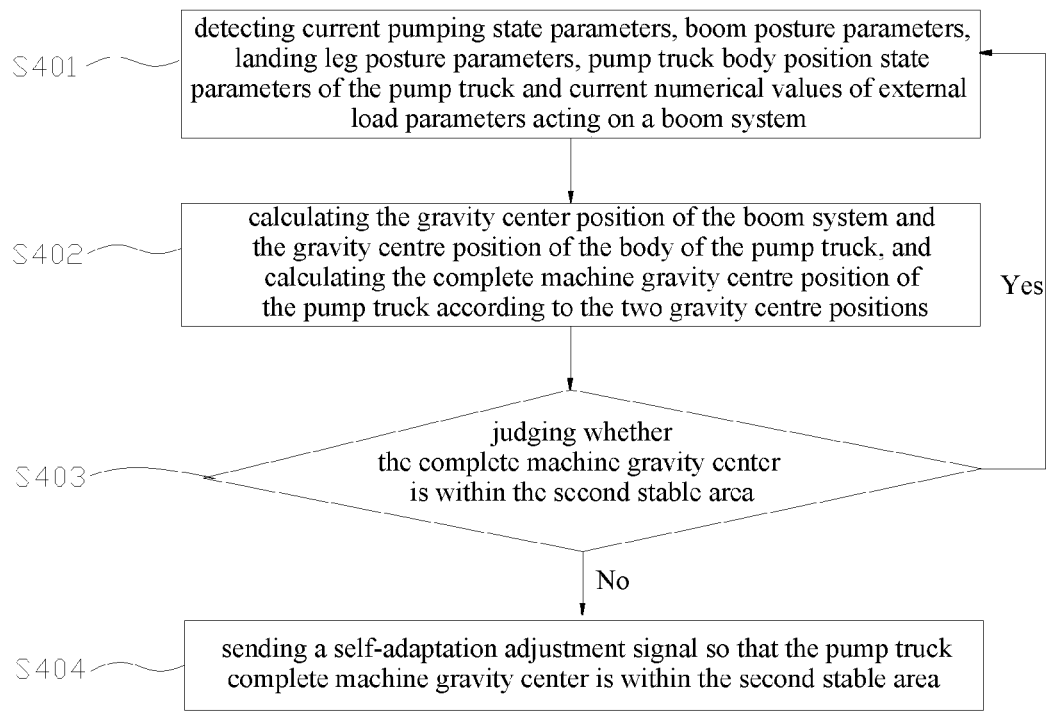
FIG. 8 is a flow chart of the fourth embodiment of the pump truck stability control method provided by the present invention.

Referring to FIG. 8, FIG. 8 is a flow chart of the fourth embodiment of the pump truck stability control method provided by the present invention, and the specific control steps are as follow:

Step S401, detecting current pumping state parameters, boom posture parameters, landing leg posture parameters, pump truck body position state parameters of the pump truck and external load parameters acting on a boom system;

Step S402, first calculating the gravity center position of the boom system according to the pumping state parameters, the boom posture parameters and the external load parameters, calculating the gravity centre position of the body of the pump truck according to the landing leg posture parameters and the pump truck body position state parameters, and then calculating the complete machine gravity centre position of the concrete pump truck according to the gravity centre position of the boom system and the gravity centre position of the body of the pump truck;

Step S403, judging whether the complete machine gravity center is within the second stable area, if it is, executing step S404, and otherwise executing step S401; and Step S404, sending a self-adaptation adjustment signal, and the pumping state controlling device of the pump truck adjusts the current pumping state parameters of the pump truck according to the self-adaptation adjustment signal, and/or, the boom posture controlling device of the pump truck adjusts the current boom posture parameters of the pump truck according to the self-adaptation adjustment signal, so that the pump truck complete machine gravity center is within the second stable area.

Figure 9:
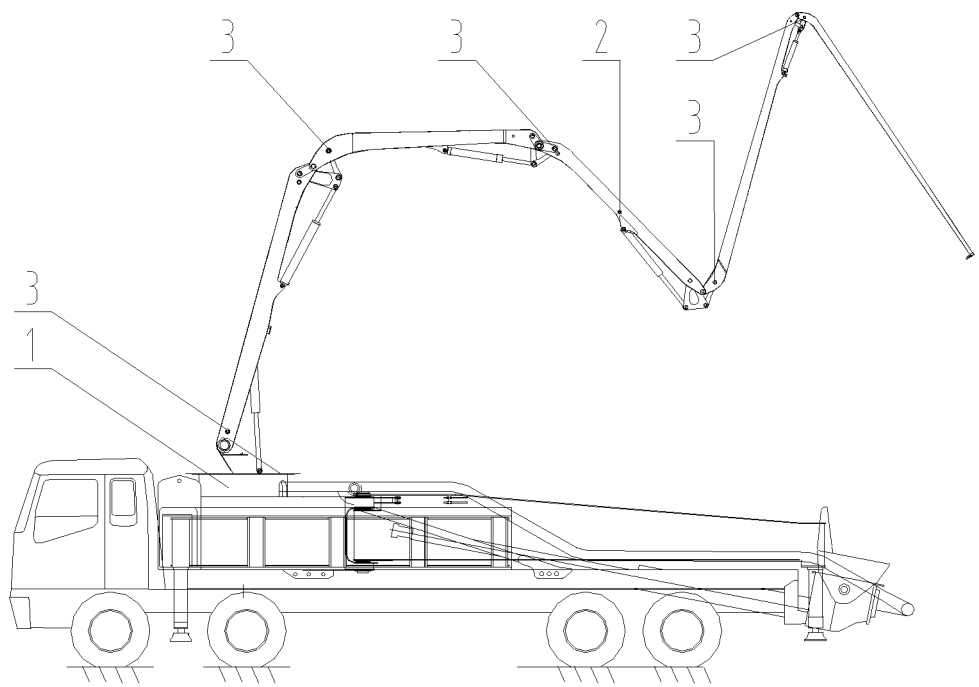
FIG. 9 is a schematic diagram of the final assembly of the concrete pump truck provided by the present invention.
Figure 10:
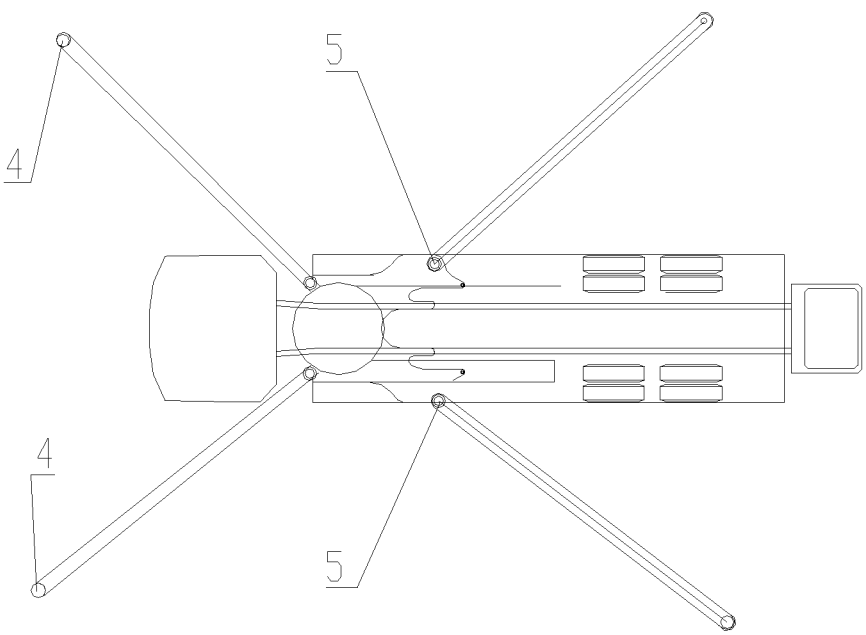
FIG. 10 is a schematic diagram of the top structure of the concrete pump truck shown in FIG. 9.

Referring to FIGS. 9 and 10, FIG. 9 is a schematic diagram of the final assembly of the concrete pump truck provided by the present invention; and FIG. 10 is a top view of the concrete pump truck shown in FIG. 9.

Based on the above stability control system, the present invention further provides a concrete pump truck, and the stability control system is the pump truck stability control system described in the above embodiments.

As the stability control system comprises the above technical effects, the concrete pump truck comprising the stability control system also comprises the technical effects.

Please refer to the prior art for other materials of the concrete pump truck, which are omitted herein.

The pump truck stability control system and the control method thereof and the concrete pump truck provided by the present invention are detailed hereinabove. Specific examples are used hereinabove to describe the principles and embodiments of the present invention, and the above embodiments are just intended to help understand the method and the core thoughts of the present invention. It should be indicated that those skilled in the art may make improvements and modifications to the present invention without departing from the principles of the present invention, and such improvements and modifications shall also be contained within the scope of protection of the claims of the present invention.

The invention claimed is:

1. A pump truck stability control system comprising a detecting device and a controlling device, characterized in that, the detecting device is used for detecting current pumping state parameters, boom posture parameters, landing leg posture parameters, pump truck body position state parameters of a pump truck and external load parameters acting on a pump truck boom system;

the controlling device comprises a complete machine gravity centre calculating unit and a pump truck stability control unit;

the complete machine gravity centre calculating unit is used for receiving the parameters detected by the detecting device, wherein, the gravity center position of the boom system is calculated according to the pumping state parameters, the boom posture parameters and the external load parameters, the gravity centre position of the body of the pump truck is calculated according to the landing leg posture parameters and the pump truck body position state parameters, and then the complete machine gravity centre position of the pump truck is calculated according to the gravity centre position of the boom system and the gravity centre position of the body of the pump truck; and the pump truck stability control unit conducts stability control over the pump truck according to the position of the complete machine gravity centre in a pump truck stable area.

2. The pump truck stability control system according to claim 1, characterized in that, the pump truck stable area comprises a first stable area, the positions of the support points of the landing legs are determined according to the landing leg posture parameters, and a first polygon boundary formed by sequentially connecting the support points of the landing legs is the boundary of the first stable area; a second stable area is provided within the boundary of the first stable area, and a second polygon boundary determined according to the first stable area and preset safe operation parameters is the boundary of the second stable area.

3. The pump truck stability control system according to claim 2, characterized in that, the controlling device further comprises an area adjusting unit which adjusts the boundary of the second stable area in combination with the pumping state parameters.

4. The pump truck stability control system according to claim 2, characterized in that, the controlling device further comprises a stability alarm unit;

when the complete machine gravity center position is out of the second stable area, the pumping truck stability control unit sends a first stability alarm signal, and the stability alarm unit conducts a first stability alarm prompt; or, when the complete machine gravity center position is within the second stable area and the minimum distance between the complete machine gravity center and the boundary of the second stable area is smaller than or equal to a predetermined safe distance, the pump truck stability control unit sends a second stability alarm signal, and the stability alarm unit conducts a second stability alarm prompt.

5. The pump truck stability control system according to claim 2, characterized in that, the controlling device further comprises a state locking unit;

when the complete machine gravity center is out of the second stable area, the state locking unit sends a state lock control signal, and the pumping state controlling device and/or boom posture controlling device of the pump truck locks the current pumping state parameters and/or the boom posture parameters of the pump truck according to the state lock signal.

6. The pump truck stability control system according to claim 2, characterized in that, the controlling device further comprises a self-adaptation adjusting unit;

when the complete machine gravity center is out of the second stable area, the self-adaptation adjusting unit sends a self-adaptation adjustment signal, and the pumping state controlling device and/or boom posture controlling device of the pump truck adjusts the current pumping state parameters and/or the boom posture parameters of the pump truck according to the self-adaptation adjustment signal so that the complete machine gravity center is within the second stable area.

7. The pump truck stability control system according to claim 1, characterized in that, the detecting device comprises a detecting unit for detecting the external load on the boom system, which is provided on the boom of the pump truck.

8. The pump truck stability control system according to claim 1, characterized in that, the gravity center position of the boom system is calculated according to the following formulas:

$$\begin{cases} \sum_{i=1}^{n} OF_{iz} \times F_{iz} + OG_{1z} \times G_{1z} + OG_{2z} \times G_{2z} + Mf_{1z} + K3 = 0 \\ \sum_{i=1}^{n} OF_{iy} \times F_{iy} + OG_{1y} \times G_{1y} + OG_{2y} \times G_{2y} + Mf_{1y} + K2 = 0 \\ \sum_{i=1}^{n} OF_{ix} \times F_{ix} + OG_{1x} \times G_{1x} + OG_{2x} \times G_{2x} + Mf_{1x} + K1 = 0 \end{cases}$$

$$\begin{cases} \sum_{i=1}^{n} F_{iz} + G_{1z} + G_{2z} + f_{1z} = 0 \\ \sum_{i=1}^{n} F_{iy} + G_{1y} + G_{2y} + f_{1y} = 0 \\ \sum_{i=1}^{n} F_{ix} + G_{1x} + G_{2x} + f_{1x} = 0 \end{cases}$$

wherein, in the above formulas, $F_{ix}$, $F_{iy}$ and $F_{iz}$ respectively represent the component forces of the gravity force of the $i^{th}$ zoom at axis x, axis y and axis z, $OF_{1x}$, $OF_{1y}$ and $OF_{1z}$ respectively represent the arms of force of the component forces of the gravity force of the $i^{th}$ zoom at axis x, axis y and axis z, $G_{1x}$, $G_{1y}$ and $G_{1z}$ respectively represent the component forces of the force determined by the external load parameters at axis x, axis y and axis z, $OG_{1x}$, $OG_{1y}$ and $OG_{1z}$ respectively represent the arms of force of the component forces of the force determined by the external load parameters at axis x, axis y and axis z, $G_{2x}$, $G_{2y}$ and $G_{2z}$ respectively represent the component forces of the gravity forces of a zoom connecting part and axis x, axis y and axis z, $OG_{1x}$, $OG_{1y}$ and $OG_{1z}$ respectively represent the arms of force of the component forces of the force determined by the external load parameters at axis x, axis y and axis z, $G_{2x}$, $G_{2y}$ and $G_{2z}$ respectively represent the component forces of the gravity forces of a zoom connecting part and a conveying pipe at axis x, axis y and axis z, $Mf_{1x}$, $Mf_{1y}$ and $Mf_{1z}$ respectively represent the torques of pumping impact at axis x, axis y and axis z, $OG_{2x}$, $OG_{2y}$ and $OG_{2z}$ respectively represent the arms of force of the component forces of the gravity forces of the zoom connecting part and the conveying pipe at axis x, axis y and axis z; and K1, K2 and K3 respectively represent torque compensation values acting on axis x, axis y and axis z.

9. A pump truck, characterized by, comprising the pump truck stability control system according to claim 1.

10. A pump truck stability control method, characterized by, comprising following steps:

S101, detecting current pumping state parameters, boom posture parameters, landing leg posture parameters, pump truck body position state parameters of a pump truck and external load parameters acting on a boom system of the pump truck;

S102, calculating the gravity center position of the boom system according to the pumping state parameters, the boom posture parameters and the external load parameters, calculating the gravity centre position of the body of the pump truck according to the landing leg posture parameters and the pump truck body position state parameters, and then calculating the complete machine gravity centre position of the pump truck according to the gravity centre position of the boom system and the gravity centre position of the body of the pump truck; and S103, conducting stability control over the pump truck according to the position relationship of the complete machine gravity centre in a pump truck stable area.

11. The pump truck stability control method according to claim 10, characterized in that, the pump truck stable area comprises a first stable area, the polygon boundary formed by sequentially connecting the support points of the landing legs is the boundary of the first stable area; a second stable area is provided within the boundary of the first stable area, and a second polygon boundary determined according to the first stable area and preset safe operation parameters is the boundary of the second stable area.

12. The pump truck stability control method according to claim 11, characterized in that, step S103 is specifically as follow:
when the complete machine gravity center position is out of the second stable area, a first stability alarm signal is sent to conduct a first stability alarm prompt; or, when the complete machine gravity center position is within the second stable area and the minimum distance between the complete machine gravity center and the boundary of the second stable area is smaller than or equal to a predetermined safe distance, a second stability alarm signal is sent to conduct a second stability alarm prompt.

13. The pump truck stability control method according to claim 11, characterized in that, step S103 is specifically as follow:
when the complete machine gravity center is out of the second stable area, a state lock control signal is sent, and the pumping state controlling device and/or boom posture controlling device of the pump truck locks the current pumping state parameters and/or the boom posture parameters of the pump truck according to the state lock signal.

14. The pump truck stability control method according to claim 11, characterized in that, step S103 is specifically as follow:
when the complete machine gravity center is out of the second stable area, a self-adaptation adjustment signal is sent, and the pumping state controlling device and/or boom posture controlling device of the pump truck adjusts the current pumping state parameters and/or the boom posture parameters of the pump truck according to the self-adaptation adjustment signal so that the complete machine gravity center of the pump truck is within the second stable area.

15. The pump truck stability control system according to claim 3, characterized in that, the controlling device further comprises a stability alarm unit;
when the complete machine gravity center position is out of the second stable area, the pumping truck stability control unit sends a first stability alarm signal, and the stability alarm unit conducts a first stability alarm prompt; or, when the complete machine gravity center position is within the second stable area and the minimum distance between the complete machine gravity center and the boundary of the second stable area is smaller than or equal to a predetermined safe distance, the pump truck stability control unit sends a second stability alarm signal, and the stability alarm unit conducts a second stability alarm prompt.

16. The pump truck stability control system according to claim 3, characterized in that, the controlling device further comprises a state locking unit;
when the complete machine gravity center is out of the second stable area, the state locking unit sends a state lock control signal, and the pumping state controlling device and/or boom posture controlling device of the pump truck locks the current pumping state parameters and/or the boom posture parameters of the pump truck according to the state lock signal.

17. The pump truck stability control system according to claim 3, characterized in that, the controlling device further comprises a self-adaptation adjusting unit;
when the complete machine gravity center is out of the second stable area, the self-adaptation adjusting unit sends a self-adaptation adjustment signal, and the pumping state controlling device and/or boom posture controlling device of the pump truck adjusts the current pumping state parameters and/or the boom posture parameters of the pump truck according to the self-adaptation adjustment signal so that the complete machine gravity center is within the second stable area.

* * * * *